(12) United States Patent
Pelletier

(10) Patent No.: US 9,648,026 B2
(45) Date of Patent: May 9, 2017

(54) CRYPTOGRAPHIC METHOD FOR SECURELY EXCHANGING MESSAGES AND DEVICE AND SYSTEM FOR IMPLEMENTING THIS METHOD

(71) Applicant: Nagravision S.A., Cheseaux-sur-Lausanne (CH)

(72) Inventor: Hervé Pelletier, Cugy (CH)

(73) Assignee: NAGRAVISION SA, Cheseaux-sur-Lausanne (CH)

( * ) Notice: Subject to any disclaimer, the term of this patent is extended or adjusted under 35 U.S.C. 154(b) by 151 days.

(21) Appl. No.: 14/731,596

(22) Filed: Jun. 5, 2015

(65) Prior Publication Data

US 2015/0365424 A1 Dec. 17, 2015

(30) Foreign Application Priority Data

Jun. 12, 2014 (EP) .................................. 14172225

(51) Int. Cl.
| | |
|---|---|
| *H04L 9/32* | (2006.01) |
| *H04L 29/06* | (2006.01) |
| *H04L 9/00* | (2006.01) |
| *H04L 9/06* | (2006.01) |
| *G09C 1/00* | (2006.01) |

(52) U.S. Cl.
CPC .............. *H04L 63/123* (2013.01); *G09C 1/00* (2013.01); *H04L 9/004* (2013.01); *H04L 9/0625* (2013.01); *H04L 9/0631* (2013.01); *H04L 63/061* (2013.01); *H04L 63/0869* (2013.01); *H04L 2209/12* (2013.01)

(58) Field of Classification Search
CPC ..... H04L 63/123; H04L 9/004; H04L 9/0625; H04L 9/0631; H04L 63/0869; H04L 2209/12

USPC .................................................. 713/170, 171
See application file for complete search history.

(56) References Cited

U.S. PATENT DOCUMENTS

| | | | | |
|---|---|---|---|---|
| 6,396,928 | B1 * | 5/2002 | Zheng .................... | H04L 9/3013 380/283 |
| 8,380,982 | B2 * | 2/2013 | Miyabayashi ...... | H04L 63/0823 380/270 |
| 8,577,039 | B2 * | 11/2013 | Matsuo ................. | H04L 9/0844 380/268 |
| 9,330,270 | B2 * | 5/2016 | Ochiai ................... | G06F 21/602 |
| 2004/0071291 | A1 | 4/2004 | Romain et al. | |
| 2007/0177720 | A1 | 8/2007 | Bevan et al. | |
| 2010/0005307 | A1 * | 1/2010 | Prashanth ............. | H04L 9/3247 713/176 |

\* cited by examiner

*Primary Examiner* — Saleh Najjar
*Assistant Examiner* — Feliciano Mejia
(74) *Attorney, Agent, or Firm* — Harness, Dickey & Pierce, P.L.C.

(57) ABSTRACT

At least one embodiment refers to a method for securely exchanging messages between at least two devices, each of them storing a shared secret key. The method comprises: at each device: generating a random number, then sending it to the other devices; determining a first key by a first operation based onto said secret key and each random number; determining a second key based on said first key and said random numbers; at a sending device: determining a pseudo message on the basis of the message and said random numbers; calculating then sending a cryptogram on the basis of said pseudo message and said second key; and at the receiving device: decrypting said cryptogram by means of said second key; and retrieving said message from said pseudo message.

13 Claims, 3 Drawing Sheets

CRYPTOGRAPHIC METHOD FOR SECURELY EXCHANGING MESSAGES AND DEVICE AND SYSTEM FOR IMPLEMENTING THIS METHOD

CROSS REFERENCE TO RELATED APPLICATIONS

This application is a U.S. National Application which claims priority from European Patent No. EP 14172225.6 filed Jun. 12, 2014.

TECHNICAL FIELD

At least one embodiment relates to the field of data transfers between devices connected together, involving cryptographic operations for securely sending and receiving any kind of messages that have to be exchanged between these devices.

BACKGROUND ART

There are a lot of known methods involving cryptographic algorithms, such as the Data Encryption Standard (DES) or the Advanced Encryption Standard (AES), for encrypting and decrypting data to be transmitted via unsecured channels or networks connecting electronic devices of any kind. To this end, such devices are provided with cryptographic components performing cryptographic operations to scramble messages so as to make them unintelligible without a secret decryption key. These components are typically implemented according to the CMOS technology (Complementary Metal Oxide Semiconductor technology). Cryptographic algorithms implemented in such components are generally safe enough from a mathematical point of view. However, the fact that such an algorithm is physically implemented by integrated circuits built with interconnected transistors for producing the logical functions of this algorithm, generates observable physical quantities. The observation of such quantities can be carried out by means of an oscilloscope, for instance for monitoring the power consumption of the integrated circuit. Sudden power consumption variations appear as peaks on the screen of the oscilloscope. Each peak can for instance identify the start of a so-called "round", typically in algorithm such as DES and AES in which an input message to encrypt is applied to a succession of groups of operations called "rounds". According to such an algorithm, each round is placed under the control of a sub-key resulting from the previous round. Therefore, such an algorithm involves a series of sub-keys which are derived from a secret key used as initial key within the algorithm. In the event where this initial secret key is known by a malicious person, the latter becomes able to decrypt and properly encrypt any message exchanged with a corresponding device that uses the same algorithm with the same secret key according to a symmetrical encryption scheme.

There are several ways to attack a cryptographic circuit for recovering the initial secret key. Some attacks are known as non-invasive attacks since they aim to observe the power consumption, the electromagnetic emanation or the processing time of the circuit. Other attacks are referenced as invasive attacks, since they involve modifying the circuit, in particular its behavior during a short lapse of time. In this last category, one knows the Differential Fault Analysis (DFA) as being a serious threat against any encryption/decryption system. Differential Fault Analysis is based on the observation and the comparison of the outputs provided by a cryptographic circuit under two different states. One of these states corresponds to the normal operation of the circuit, whereas the other is obtained by voluntarily injecting a fault aiming to alter one or several bits by switching from 0 to 1 or vice versa. Such a physical bit inversion can be carried out e.g. by sweeping the surface of the integrated circuit with a laser beam. By locating sensitive areas within the cryptographic circuit, laser shots allow disrupting the behavior of the circuit in an accurate and easy manner, since they can be implemented under the control of a computer, while acting with a very good spatial and temporal resolution. When several faults are injected during the processing of a cryptographic algorithm, the analysis of erroneous outputs allow to guess the secret key by observing fault propagations within the algorithm.

Accordingly, there is a need to provide an efficient solution allowing to prevent attackers guessing the secret key through any differential fault analysis, or more generally to guess such a key through information gained by any kind of analysis.

SUMMARY OF THE INVENTION

The aim of at least one embodiment is to solve, at least in part, the aforementioned drawbacks. To this end, at least one embodiment suggests a cryptographic method and a device for securely exchanging data between at least two devices, involving the implementation of a cryptographic process which is particularly complex. According to at least one embodiment, the secret key, which is shared by all of the devices of the same system as a symmetrical key, is never directly used as encryption/decryption key of the exchanged messages. Indeed, the key that is used to encrypt/decrypt the messages exchanged between the devices of a same system always depend on a plurality of random numbers, in particular. More specifically, each device generates at least one random number which is taken into account for determining the key that is used for encrypting/decrypting the exchanged messages. Accordingly, if the system comprises three devices, the aforementioned key will depend on at least three random numbers.

Moreover, an additional key level is determined before encrypting/decrypting the message to be exchanged. Accordingly, the present method involves three key levels for encrypting/decrypting the messages. In addition, the message to exchange is never directly used as input data of the algorithm for generating the cryptogram that has to be sent, but it is always used with each of the random numbers to first generate a pseudo message that will be then encrypted by the aforementioned cryptographic algorithm.

Preferably, the random numbers are renewed each time a message has to be exchanged. Accordingly, at least one embodiment prevents any malicious person to guess the shared secret key through any attack involving a differential fault analysis. Furthermore, thanks to the complexity provided both by the pseudo message and the derived key used for the encryption, the cryptographic method of at least one embodiment reaches a particularly high level of security.

The aim and the advantages of at least one embodiment are achieved thanks to the cryptographic method consistent with the subject-matter of claim 1 and thanks to a device consistent with the subject-matter of claim 11.

Other advantages and embodiments will be presented in the following detailed description.

BRIEF DESCRIPTION OF THE DRAWINGS

At least one embodiment will be better understood thanks to the attached figures in which.

DETAILED DESCRIPTION

Figure 1:
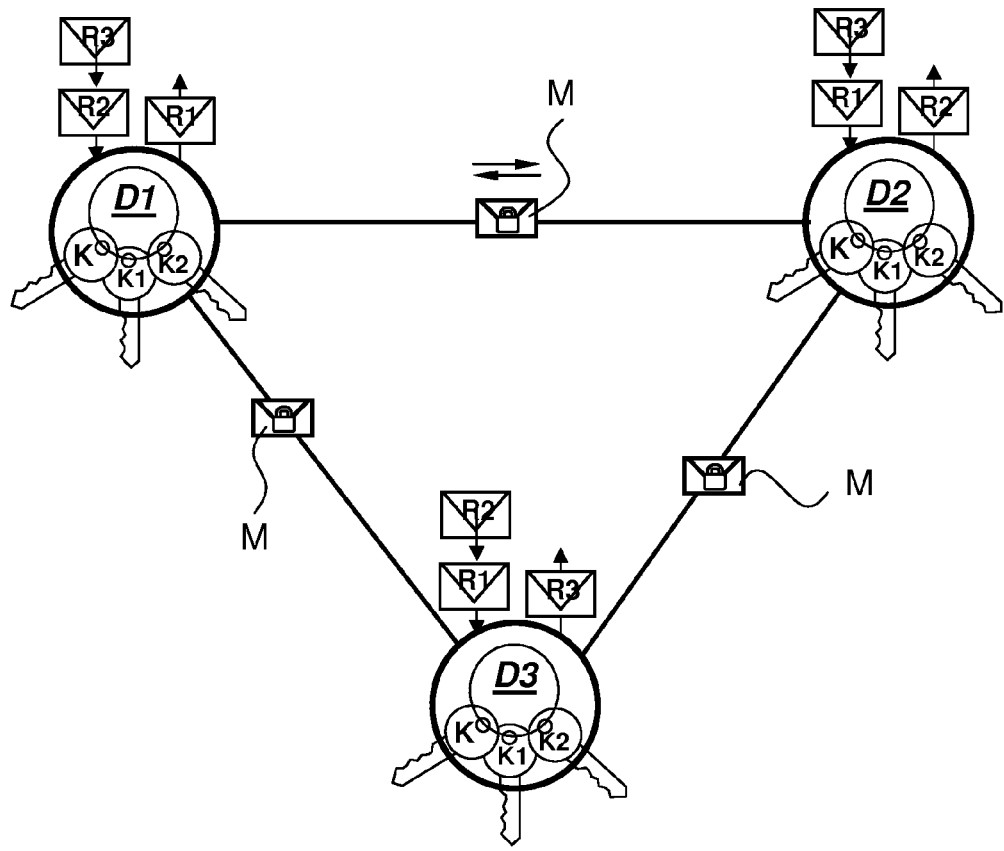
FIG. 1 depicts an overview of the system according to at least one embodiment.

Referring to FIG. 1, the latter schematically shows an overview of a system embodiment in which the method and a plurality of devices of the present can be implemented. The communication system shown in this Figure shows three devices D1, D2, D3 connected together through any manner. It should be noted that the number of devices D1, D2, D3, etc. . . . is unlimited and the system illustrated in this Figure is taken as one example among many other possibilities, both in terms of connection or of number of devices. Such a system could include two devices only, connected together either via a network, such as the Internet, or through any other kind of connection (wired or wireless), in particular an unsecured connection.

Each device D1, D2, D3 can exchange messages M with at least one other device, preferably with any other device in the system. As these messages M are securely exchanged, they have been illustrated in this Figure by envelopes, each stamped with a padlock. To encrypt or decrypt secured messages M, each device D1, D2, D3 must handle at least three cryptographic keys K, K1, K2. One of these keys is a shared secret key K common to all of the devices D1, D2, D3 of the system. This secret key K can be implemented during the manufacturing of the device D1, D2, D3 or its related chipset, or afterwards during their personalization stage or during an initialization phase.

As schematically shown in this Figure, each device sends and receives other data denoted R1, R2, R3. Such data refer to random numbers. Each device (e.g. D1) generates one random number (R1) which is sent to the other devices (D2, D3) and receives the random number (R2, R3) generated by each of the other devices (D2, D3). On the basis of the overview provided by FIG. 1, the method for securely exchanging messages M between at least two devices will be described in detail with reference to FIG. 2.

Figure 2:
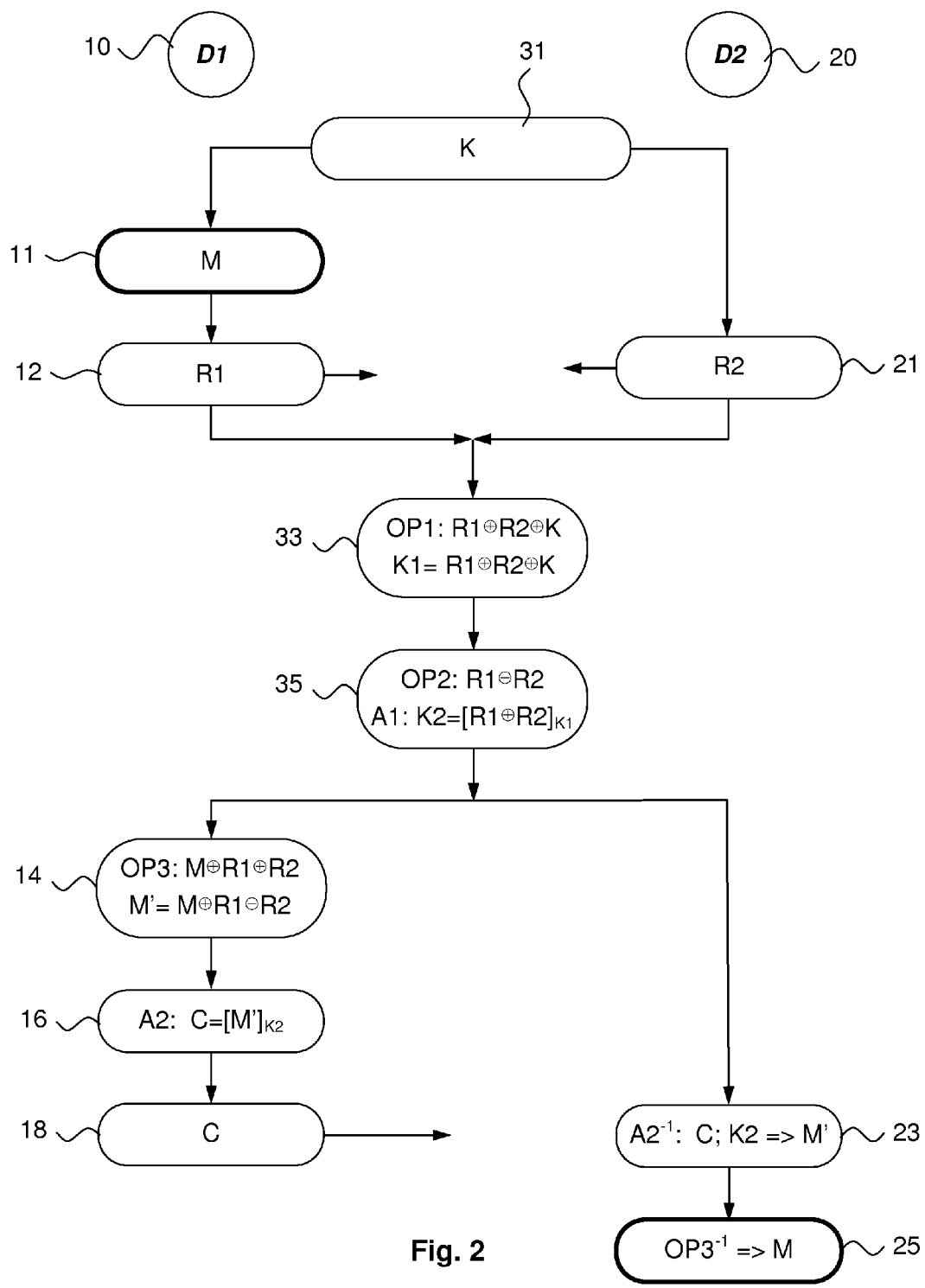
FIG. 2 is a flowchart showing at least one embodiment of the cryptographic method.

For the sake of simplicity, FIG. 2 discloses, step by step, the method of at least one embodiment while referring to a system comprising two devices only, D1 and D2, respectively identified by the reference numerals 10, 20. On this figure, the steps performed by each of these devices are shown in several columns and follow one another from top to bottom. The common steps which are performed both by each of the devices are represented in a central column. It should be noted that these common steps are carried out by each device in an individual manner. There is no requirement to process the common steps simultaneously within each involved device for exchanging messages.

As already mentioned, each device D1, D2, comprises a shared secret key K common to all the devices wanting to mutually exchange messages. This secret key K is shown in box 31 of FIG. 2. In this embodiment, the device D1 is intended to send a message M to the device D2. Accordingly, the first device D1 corresponds to the sending device and the second device D2 corresponds to the receiving device. Although there is only one receiving device shown in this Figure, it should be understood that the same message M could be sent from the sending device to a plurality of receiving devices. At box 11, the sending device D1 has to prepare or retrieve the message M that has to be sent. Such a message M can refer to any kind of data, but usually it will refers to sensitive data, whose nature mainly depends on the type of devices involved in the communication system in question.

Each device D1, D2 generates a random number before to send it to the other device, in particular to a plurality of selected devices or to all of the other devices in case the system comprises more than two devices. This step is shown at boxes 12, 21, where the sending device D1 generates a first random number R1, which is sent to the receiving device D2, and the latter generates a second random number R2 which is sent to the sending device D1. Performing a mutual exchange of the random numbers with each devices can be achieved even if these devices did not beforehand agreed to exchange an upcoming message, for instance by means of a specific signal recognized by these devices during a prior step. In this case, one could be expected that the mere fact of receiving a random number R1 (i.e. data that can be identified as such, either through a specific identifier, or by means of a particular format) can be recognized by the receiving device(s) as being a trigger signal which informs that a message M must be received from the sending device. Accordingly, each device becomes fully able to run the required steps of the present method in due time.

Moreover, in the case where the system involves more than two devices, as shown in the example of FIG. 1, one can further provide means to identify the sending device at the receiving device, if necessary. If the communication is not still established between the sending device and the receiving device(s) e.g. during a current session, a possible way could be to identify the address of the sending device or to transmit the identifier (ID) of the sending device towards the receiving device. This can be achieved, for instance by appending, to the random number R1, the ID number belonging the sending device D1 or by including such an ID in any other data.

At box 33, each device D1, D2, determines a first key K1 by calculating a first operation OP1 which uses both the shared secret key K and each random number R1, R2 as operands. In the illustration provided by FIG. 2, this first operation OP1, as well as other subsequent operations, refers to an exclusive OR operation, as a non-limitative example. In accordance with a preferred embodiment and as shown in this box 33, the result of the first operation OP1 is directly used as first key K1.

At box 35, each device D1, D2, subsequently calculates a second operation OP2 that uses at least each random number R1, R2 as operands. Then, on the basis of the result of this second operation OP2, each device D1, D2 further determines a second key K2. In accordance with the example of box 35, this is carried out by encrypting the result of the second operation OP2 by means of a first algorithm, denoted A1, which uses the first key K1 as encryption key. Accordingly, the second operation, or directly its result, is input into the first algorithm A1 together with the required first cryptographic key K1. In response, this first algorithm provides the second cryptographic key K2 as output.

At box 14, the device acting as sending device D1 calculates a third operation OP3 which uses both the message M and each random number R1, R2 as operands. By this way, the sending device D1 determines a so-called pseudo message M' given that it is based onto the message M, but it looks different from the initial message M, although the latter has still not being encrypted.

At box 16, the sending device D1 calculates a cryptogram C which results from the encryption of the pseudo message M'. To this end, it uses the pseudo message M' as input of a second algorithm A2 together with the second key K2 as encryption key.

At box 18, the cryptogram C is transmitted by the sending device to at least one other device acting as receiving device.

When the receiving device D2 obtains the cryptogram C, it is able to decrypt it by means of the same algorithm A2 and the same key K2, as shown at box 23. To this end, the second algorithm A2 will be, or will include, a two-way function that can be reverted (see the notation $A2^{-1}$ on FIG. 2). Of course, the same algorithm has to be used both by the sending and the receiving devices. According to the preferred embodiment, the second key K2 is used as direct or indirect decryption key of the second algorithm. The use of second key K2 as indirect key will be described with reference to FIG. 3. In any case, the decryption of the cryptogram C allows to retrieve the pseudo message M' as a result of the second algorithm A2.

Finally, at box 25, each receiving device D2 retrieves the message M in its initial plaintext form, from the pseudo message M' by reversing the third operation OP3 (see the notation $OP3^{-1}$ on FIG. 2).

It should be noted that the first algorithm A1 can be different or identical to the second algorithm A2. However and contrarily to the second algorithm, the first algorithm can use a one-way function (or it may be itself such a function) that provides the second key K2. Accordingly, such a second key K2 could be the digest of a hash function or could be derived from such a function, for instance.

Whatever the algorithms (A1, A2) used in this method, they must be the same for all devices who want to exchange messages M. These algorithms can be implemented within each device through different ways, for instance during the manufacturing of the devices, during their personalization or during an initialization phase.

Figure 3:
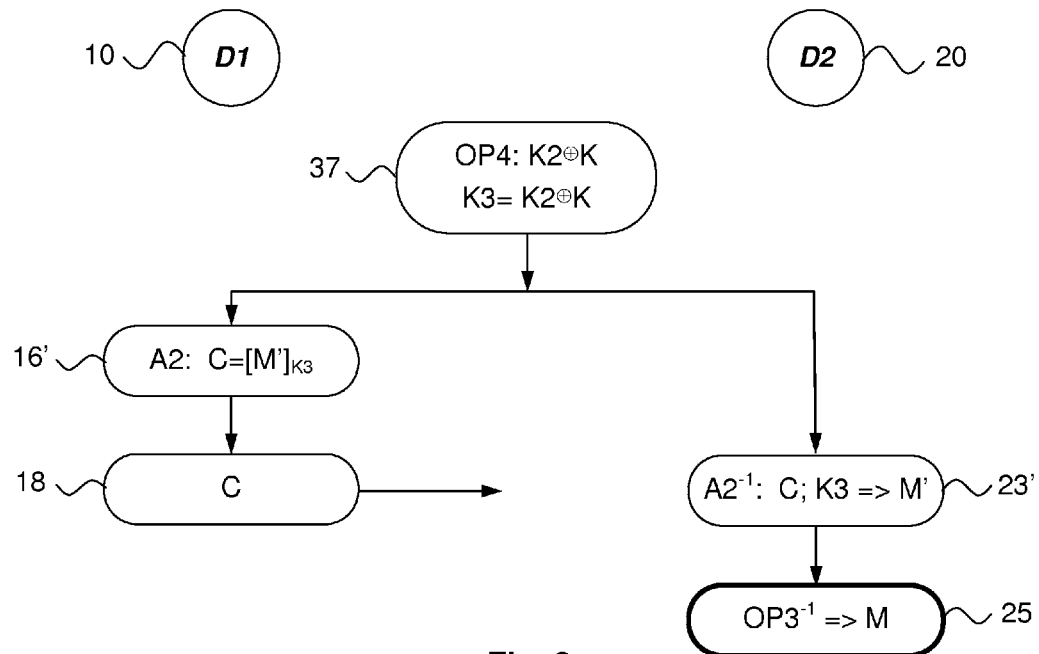
FIG. 3 shows an alternative of an extract of the flowchart of FIG. 2.

Referring now to FIG. 3, this Figure shows the last steps of the method illustrated in FIG. 2, where the box 37 represents an additional step as an alternative of the previous flowchart. This variant corresponds to the case where the second key K2 is used as indirect encryption/decryption key within the second algorithm A2. To this end, a third key K3 is determined, at each device D1, D2, by a fourth operation OP4 which uses both the second key K2 and the shared secret key K as operands. As shown at box 37, the result of this fourth operation OP4 provides the third cryptographic key K3.

In a similar way as for the algorithms, all of the operations OP1, OP2, OP3, OP4, or some of them, can be implemented within each device during the manufacturing of the devices, during their personalization or during an initialization phase.

As for the sending device D1, the step shown at box 37 is carried out between the steps of boxes 35 and 16, since it needs the second key K2 (determined by the step of box 35) and the result of this additional step will be used with the second algorithm A2 (during the step shown at box 16). As for the receiving device(s) D2, this additional step is carried out between the steps of boxes 35 and 23 for the same reasons.

As shown in FIG. 3, the use of the second key K2 into the second algorithm A2 (i.e. within the steps of boxes 16 and 23) has been substituted by the third key K3. This results from the fact that the second key K2 is used in an indirect manner in these steps. For this reason, the reference numerals of these two boxes have been respectively amended into 16' and 23' in FIG. 3.

It should be noted that certain steps shown in FIG. 2 or FIG. 3 could be placed in a different order. For instance, the steps of box 14 could be carried out any where between the exchanges of the random numbers R1, R2 (at boxes 12, 21) and the encryption of the pseudo message M' (at box 16, 16'). The same principle applies for the steps of box 37, as explained before.

According to one embodiment, at least part of at least any of the operations OP1, OP2, OP3, OP4 involves a logical operation (Boolean algebra). More particularly, this logical operation is an exclusive OR operation (see the symbolic notation $\oplus$ in FIGS. 2 and 3). It should be noted that other logical functions (i.e. basic and/or derived operations) could be used instead of the XOR operator or with the XOR operator.

According to another embodiment, at least a part of at least any of the operations OP1, OP2, OP3, OP4 involves a number raised to a power. In this case, any of the operands of the relevant operation is used as an exponent of this number which is chosen among the other operands of this operation.

To perform logical operations, the involved operands must have the same digit number. In other words and since the operations refer to binary operations, the operands must have the same bit length. Therefore and depending on the type of operation carried out e.g. in box 33 (OP1), both the bit length of the random numbers R1, R2 and the bit length of the shared secret key K should be the same. Regarding to the second operation OP2 as shown in the example of box 35, the random numbers R1, R2 must have the same bit length. The same principle applies to the third and fourth operations regarding both the random numbers R1, R2 and the message M, on the one hand, and the cryptographic keys K2, K, on the other hand.

For this reason, if the operands of any one of the operations OP1, OP2, OP3, OP4 have different bit lengths, then the present method can further comprise a step aiming to restore the same bit length for each of these operands. To this end, restoring the same bit length can be achieved by several different manners.

According to at least one embodiment, that can be achieved by a "balancing step" aiming to supplement the operand having the smallest bit length until its bit length is equal to the bit length of any of the other operands of the relevant operation. Then, this balancing step can be repeated until all the operands of the relevant operation have the same bit length. The step aiming to supplement the operand can be achieved by a succession of bits 0, by a succession of bits 1, even by a succession of a specific combination of these two bits 0 and 1. Of course, the selected bit succession must be known both by the sending device and the receiving device(s), through any process mentioned before, for instance during the personalization of the devices or their chipsets.

In variant, this balancing step could be achieved by supplementing the operand having the smallest bit length until the bit length of the other operand (i.e. preferably the operand having the longest bit length) is equal to a multiple of the bit length of the supplemented operand.

According to another embodiment, the so-called balancing step can be first performed by concatenating the operand having the smallest bit length with itself, until reaching the same bit length as the other operand. This approach implies that the operand which has the longest bit length is a multiple of the other operand (i.e. the concatenated operand). In the case where one operand is not exactly a multiple of the other operand, the aforementioned concatenation can be performed until reaching a bit length reduced by a residual value less than the bit length of the concatenated operand. This residual bit length corresponds to the remainder of the Euclidean division where the operand having the longest bit length is the dividend and the operand to concatenate is the divisor. Then, the residual bit length (i.e. the residual value) can be supplemented by any succession of bits, as explained above.

As examples of one of these embodiments applied in particular to the third operation OP3, restoring the same bit length can be achieved for each of said random numbers R1, R2 by concatenating said random number with itself, until reaching the same bit length as that of the message M. This embodiment involves that the random numbers R1, R2 have the same bit length and that the bit length of the message M is a multiple of that of one of the random number. If this latter condition is not fulfilled, then the residual bit length can be supplemented as already explained.

In variant and while still referring to the third operation OP3, restoring the same bit length could be achieved first by supplementing the message M until its bit length is equal to a multiple of the bit length of any of the random number R1, R2, then by slicing the supplemented message M into blocks having the same bit length as the bit length of the random number before using each of these blocks as a new message (M) to be processed by the steps of the present cryptographic method.

According to another embodiment and for the sake of simplification, the cryptographic keys used in the present method, preferably at least the second key K2 and the shared secret key K, have the same bit length. For the same reason, all the random numbers R1, R2 have also the same bit length.

Advantageously, by generating a random number at each device and by using all of the generated random numbers both for deriving the cryptographic key K2, K3, that is used for calculating the cryptogram C, and for determining the pseudo message M' to encrypt, the subject-matter of at least one embodiment significantly increases the security applied to the exchanged messages M.

Still advantageously, even if one of the random numbers is guessed by a malicious person, the latter will be unable to deduce the key that has been used for encrypting the pseudo message M'. Furthermore, even if that key could be discovered by such a person, he would still unable to retrieve the initial message M from the pseudo message M', given that to recover the original message M, such a person first needs to possess all the random numbers and then he must know what is the third operation (OP3) undertaken in the method. This also requires be aware of all the operators used in this operation, and even to know the order of each operator and each operand used within this operation, depending on the nature of this operation.

Still advantageously, the shared secret key K is never directly used as cryptographic key in any one of the cryptographic algorithms A1, A2 implemented in the present method. In contrast, the shared secret key K is only used within mathematical operations (OP1, OP4) whose results are subsequently used as keys into these algorithms. Accordingly, the shared secret key K is never directly exposed at the first plan, within a cryptographic algorithm.

Preferably, the steps of the present method are undertaken each time a message M has to be exchanged. This can be applied whatever the embodiment of the method. Accordingly, the random numbers generated by each device have a single use, given that a new random number is generated, by each device, each time a new message has to be sent. Therefore, the shared secret key K is advantageously different whenever a message M is exchanged. This provides a strong method for securely exchanging messages and in particular a method for preventing any DFA attacks.

Finally, it should be noted that the message M can comprise any type of data, in particular sensitive data such as passwords, control words, cryptographic key or any other confidential information.

At least one embodiment also refers to a device or to a system suitable for implementing any of the embodiments of the above-described method.

Figure 4:
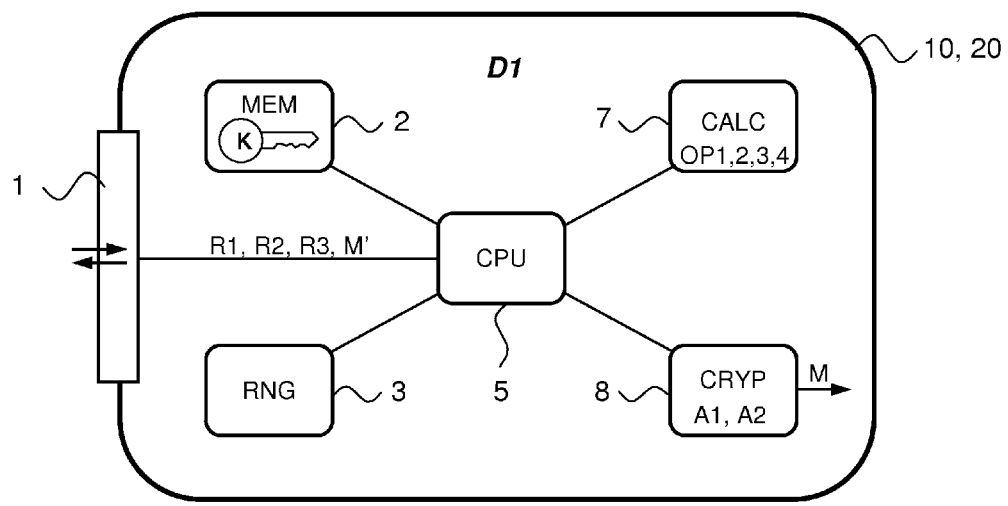
FIG. 4 is a schematic representation of one of the devices of the system shown in FIG. 1.

Referring to FIG. 4, the latter schematically shows in more detail one of the devices 10, 20 depicted in the system of FIG. 1. This device can be indifferently used as a sending device D1 or as a receiving device D2, and preferably even both as sending and receiving device. To this end, it comprises several components including at least:

a communication interface 1 for data exchange (M', R1, R2, . . . ), in particular for exchanging data with at least one other device, a secure memory 2 for storing the shared secret key K, a random generator 3 for generating a random number R1 when a message M has to be exchanged, preferably each time such a message has to be exchanged, at least one calculation unit 7 for outputting at least one result of an operation (OP1, OP2, OP3,OP4) using operands (e.g. R1, R2, K, M) as inputs, at least one cryptographic unit 8 to execute algorithms (A1, A2) by means of at least one cryptographic key (K1, K2, K3), and a central processing unit 5 in charge of managing the aforementioned components (1, 2, 3, 7, 8) in accordance with the steps of the cryptographic method described here-above.

The device 10, 20 can be used in all cases where sensitive data must be securely exchanged. Such a device can take the form of an electronic circuit (integrated circuit, preferably a monolithic circuit), such as a smartcard or a chipset suitable to be inserted into another device. The latter could be a set-top-box (within the pay-TV field), a smart phone or any other communication device. In variant, such a smartcard could be also used as a standalone device, e.g. as access card, as bank card (credit card or payment card) for communicating with a control terminal.

The calculation of each operation OP1, OP2, OP3, OP4 can be performed by using a single calculation unit 7 configured to perform different operations, or several calculation units 7, each dedicated to one of these operations. The same principle applies to the cryptographic unit 8 regarding the algorithms A1, A2.

At least one embodiment also refers to a system as shown in FIG. 1. Such a system comprises at least two cryptographic devices 10, 20, connected together, for implementing any embodiment of the above-described method. Each device 10, 20 of this system comprises at least the components which were listed above during the detailed description of the device presented as a further subject-matter of at least one embodiment. Besides, any of the devices of the system may include at least one of the above-mentioned related optional features.

The invention claimed is:

1. A cryptographic method for securely exchanging messages between at least two devices, each of them storing a shared secret key common to said devices, the method comprising:

generating a random number at each device;

sending by each device the generated random number to the other devices;

determining, at each device, a first key by calculating a first operation which uses both said shared secret key and each random number as operands;

determining, at each device, a second key by encrypting a result of a second operation with a first algorithm using said first key as encryption key, said second operation using at least each random number as operands;

determining, by one of said devices acting as a sending device, a pseudo message by calculating a reversible third operation which uses both said message and each random number as operands;

calculating, by said sending device, a cryptogram resulting from the encryption of said pseudo message with a second algorithm using said second key as direct or indirect encryption key;

transmitting said cryptogram from said sending device to at least one other device acting as receiving device;

receiving said cryptogram at said receiving device;

decrypting the cryptogram at the receiving device by using said second key as direct or indirect decryption key of said second algorithm to recover said pseudo message;

retrieving said message from said pseudo message by reversing said third operation.

2. The cryptographic method of claim 1, wherein the use of said second key as indirect encryption or decryption key, within the second algorithm, is performed with a third key determined, at each device, by a fourth operation using said second key and said shared secret key as operands.

3. The cryptographic method of claim 1, wherein at least a part of at least any of said operations involves a logical operation.

4. The cryptographic method of claim 3, wherein said logical operation is an exclusive OR operation.

5. The cryptographic method of claim 1, wherein if the operands of any one of said operations have different bit lengths, then restoring the same bit length for each of said operands.

6. The cryptographic method of claim 5, wherein restoring the same bit length is achieved by a balancing step aiming to supplement the operand having the smallest bit length until its bit length is equal to the bit length of any of the other operands, then repeating said balancing step until all the operands have the same bit length.

7. The cryptographic method of claim 6, wherein said balancing step is first performed by concatenating the operand having the smallest bit length with itself, until reaching the same bit length as the other operand, or until reaching a bit length reduced by a residual value less than the bit length of the concatenated operand.

8. The cryptographic method of claim 7, wherein said balancing step is applied to said third operation and the operand having the smallest bit length is any of said random numbers while said other operand is the message.

9. The cryptographic method of claim 1, wherein said first algorithm uses a one-way function.

10. The cryptographic method of claim 1, wherein at least a part of at least any of said operations involves a number raised to a power, where any of said operands is used as an exponent of said number chosen among the other operands.

11. A cryptographic device for implementing the cryptographic method of claim 1, comprising several components including at least a communication interface for data exchange, a secure memory for storing a shared secret key, a random generator for generating a random number, at least one calculation unit outputting a result of an operation using operands as inputs, at least one cryptographic unit to run algorithms by means of at least one cryptographic key, and a central processing unit in charge of managing said components in accordance with the steps of said cryptographic method.

12. The cryptographic device of claim 11, wherein it is made of a monolithic circuit.

13. A system comprising at least two cryptographic devices connected together for implementing the cryptographic method of claim 1, wherein each of said device comprises several components including at least a communication interface for data exchange, a secure memory for storing a shared secret key, a random generator for generating a random number, at least one calculation unit outputting a result of an operation using operands as inputs, at least one cryptographic unit to run algorithms by means of at least one cryptographic key, and a central processing unit in charge of managing said components in accordance with the steps of said cryptographic method.

* * * * *